United States Patent [19]

Saruwatari et al.

[11] Patent Number: 4,949,443
[45] Date of Patent: Aug. 21, 1990

[54] NUMERICALLY CONTROLLED LATHE

[76] Inventors: Tatsuhiko Saruwatari, 203, 1-30, 1-chome Shitoku, Kokurakita-ku, Kitakyushu-shi, Fukuoka; Atsushi Otani, 1086-33, Komaki, Nagareyama-shi, Chiba; Akira Kosho, 2504-53, Yamazaki, Noda-shi, Chiba; Satoru Togawa, 39-1, 4-chome Asakusa, Taito-ku, Tokyo, all of Japan

[21] Appl. No.: 371,900

[22] Filed: Jun. 26, 1989

[30] Foreign Application Priority Data

Jun. 29, 1988 [JP] Japan ................... 63-161460
May 10, 1989 [JP] Japan ..................... 1-115073
May 24, 1989 [JP] Japan ..................... 1-130492

[51] Int. Cl.$^5$ .......... B23B 3/22; B23B 7/04; B23B 29/24
[52] U.S. Cl. ................. 29/27 C; 29/40; 29/563; 82/120; 82/138
[58] Field of Search ........... 29/27 C, 38 B, 40, 563; 82/120, 121, 124, 130, 138, 159

[56] References Cited

U.S. PATENT DOCUMENTS

| 4,080,853 | 3/1978 | Goto | 29/36 |
|---|---|---|---|
| 4,204,442 | 5/1980 | Nomura | 82/18 |
| 4,587,697 | 5/1986 | Link et al. | 29/27 C |
| 4,597,144 | 7/1986 | Frank et al. | 29/40 |
| 4,656,208 | 4/1987 | Smith et al. | 29/40 |
| 4,738,170 | 4/1988 | Isawa et al. | 29/40 |
| 4,776,247 | 10/1988 | Kiya | 82/138 |
| 4,785,513 | 11/1988 | Lee et al. | 29/40 |

FOREIGN PATENT DOCUMENTS 61-51203 3/1986 Japan .
63-272401 11/1988 Japan .

Primary Examiner—William E. Terrell
Attorney, Agent, or Firm—Armstrong, Nikaido Marmelstein, Kubovcik & Murray

[57] ABSTRACT

A numerically controlled lathe which is capable of effecting combined machining comprises a frame constituting the main body, a main spindle driven to rotate, a main spindle chuck provided on the main spindle to hold a workpiece, a multiple-tool head having a plurality of tools, a turret head and a rear machining head. The multiple-tool head has three servomotors to move it along three axes which are perpendicular to each other. The body of the multiple-tool head has an annular frame structure. At least two rows of rotary and non-rotary tools for machining the workpiece are disposed on the multiple-tool head body in a direction parallel with one of the directions of movement. A tool driving motor is provided on the multiple-tool head body to drive the rotary tools. The rotary tools include a polygon machining tool for machining a polygonal workpiece. The multiple-tool head, the turret head and the rear machining head effect machining simultaneously or successively.

6 Claims, 17 Drawing Sheets

NUMERICALLY CONTROLLED LATHE

BACKGROUND OF THE INVENTION

1. Field of the Invention

The present invention relates to a numerically controlled lathe having an annular multiple-tool head, a turret head and a rear machining head. More particularly, the present invention pertains to a numerically controlled lathe having an annular multiple-tool head having a plurality of turning tools disposed in opposed relation to each other in the directions X and Y, a turret head capable of differentially rotating a cutting tool, for example, a drill, a tap, etc., relative to the main spindle to effect machining at a cutting speed suitable for the cutting tool simultaneously with the machining effected by the multiple-tool head, and a rear machining head which mainly effects machining of a workpiece held on a rear machining spindle provided on the turret head.

2. Description of the Prior Art

A typical conventional NC lathe has a turret head. The turret head has a plurality of tools and indexes a tool to be used in accordance with the kind of machining to be effected, thereby carrying out a desired machining operation. There are known various kinds of turret head structure which have different tool indexing mechanisms, for example, the rotational indexing turret head and the linear indexing turret head. Among them is Japanese Patent Laid-Open (KOKAI) No. 61-51203 (1986) wherein a multiplicity of tools are disposed so as to face each other across a workpiece in the direction of the Y-axis. This type of the turret head has advantages, for example, a short indexing time, that is, the time needed to change tools is short. To effect rear machining, i.e., machining of the rear of a workpiece held by a chuck, with the conventional NC lathe described above, it is common practice to suspend the main spindle, remove the workpiece from the chuck, reverse the workpiece and re-chuck the reversed workpiece before effecting rear machining. The reversing of the workpiece is carried out by a manual operation or using a robot hand.

Among various kinds of conventional NC lathe, there is known an opposed twin spindle NC lathe wherein a secondary-spindle is provided in opposed relation to a main spindle. This type of NC lathe also has two turret heads in order to machine a workpiece held on each spindle. Each spindle is provided with a work chuck, and the secondary-spindle is numerically controlled to chuck the workpiece delivered from the main spindle side.

In relation to the opposed twin spindle NC lathe, a machining apparatus and a machining method wherein, after one end of a workpiece has been machined on the main spindle, the workpiece is delivered to the chuck on the secondary-spindle opposing the main spindle to machine the other end of the workpiece are known [for example, Japanese Patent Laid-Open (KOKAI) No. 63-272401 (1988) and Japanese Patent Post-Exam Publication No. 51-14186 (1976)]. In the above-described opposed twin spindle NC lathe, however, when a workpiece is to be subjected to rear machining, the workpiece is delivered in such a manner that two ends thereof are respectively held with a chuck provided on the main spindle and a chuck provided on the secondary-spindle. Japanese Utility Model Post-Exam Publication No. 53-33262 (1978) discloses an apparatus wherein a work chuck and a rear machining head are provided on a turret head. Since this work chuck has no servomotor therefor, it must be externally driven.

Therefore, each of the main spindle and the secondary-spindle has a servomotor for movement along the Z-axis, that is, the axis of the main spindle. The headstock must be driven together with the head. This arrangement merely features that the secondary-spindle has the ordinary main spindle arrangement that the spindle effects delivery of a workpiece and rotates while holding it.

SUMMARY OF THE INVENTION

The gist of the present invention resides in a numerically controlled lathe including a frame constituting the main body, a main spindle driven to rotate, a main spindle chuck provided on the main spindle to hold a workpiece, a multiple-tool turret head having a plurality of tools, and a turret head, wherein the improvement comprises:

a. the multiple-tool turret head having three servomotors to move it along three axes which are perpendicular to each other;

b. the body of the multiple-tool turret head having an annular frame structure;

c. at least two rows of rotary and non-rotary tools for machining the workpiece which are disposed on the multiple-tool head body in a direction parallel with one of the directions of movement; and d. a tool driving motor disposed on the multiple-tool head body to drive the rotary tools.

According to another aspect of the present invention, there is provided a numerically controlled lathe including a frame constituting the main body, a main spindle driven to rotate, a main spindle chuck provided on the main spindle to hold a workpiece, a multiple-tool head having a plurality of tools, and a turret head, wherein the improvement comprises:

a. a servomotor provided on the frame to move the turret head along the axis of the main spindle;

b. the turret head having a secondary-chuck for holding the workpiece and a plurality of tools for machining the workpiece;

c. indexing means including driving means for indexing any of the tools or the secondary-chuck to a position where it is to be used;

d. rotational driving means for rotating the secondary-chuck and the rotary tools; and e. the secondary-chuck being capable of receiving the workpiece from the main spindle chuck and holding it.

Objects and Advantages of the Invention

With the above-described technical background, the present invention aims at attaining the following objects.

It is an object of the present invention to provide a multiple-tool head which is capable of indexing a great variety and number of tools within a short period of time.

It is another object of the present invention to provide a turret head which is capable of simultaneously machining a workpiece in linkage with the machining effected at the multiple-tool head.

It is still another object of the present invention to provide a turret head which is capable of machining a workpiece at a machining speed suitable therefor in linkage with the machining effected at the multiple-tool head.

It is a further object of the present invention to provide a turret head and a rear machining head which enable a workpiece held by a main spindle chuck and another workpiece held by a secondary-chuck provided on the turret head to be simultaneously machined at two respective positions on the same machine.

It is a still further object of the present invention to provide a turret head structure which enables the same servomotor to be used to drive a secondary-chuck provided on the turret head and to drive the sub-turret head to effect indexing.

Since a secondary-chuck is provided on the turret head, a machining operation can be conducted in cooperation with the chuck provided on the main spindle, so that it is possible to realize an efficient machining operation. In addition, provision of a rear machining head enables machining to be conducted at two positions on the same machine and hence permits realization of efficient machining.

DESCRIPTION OF THE PREFERRED EMBODIMENTS

Figure 1:
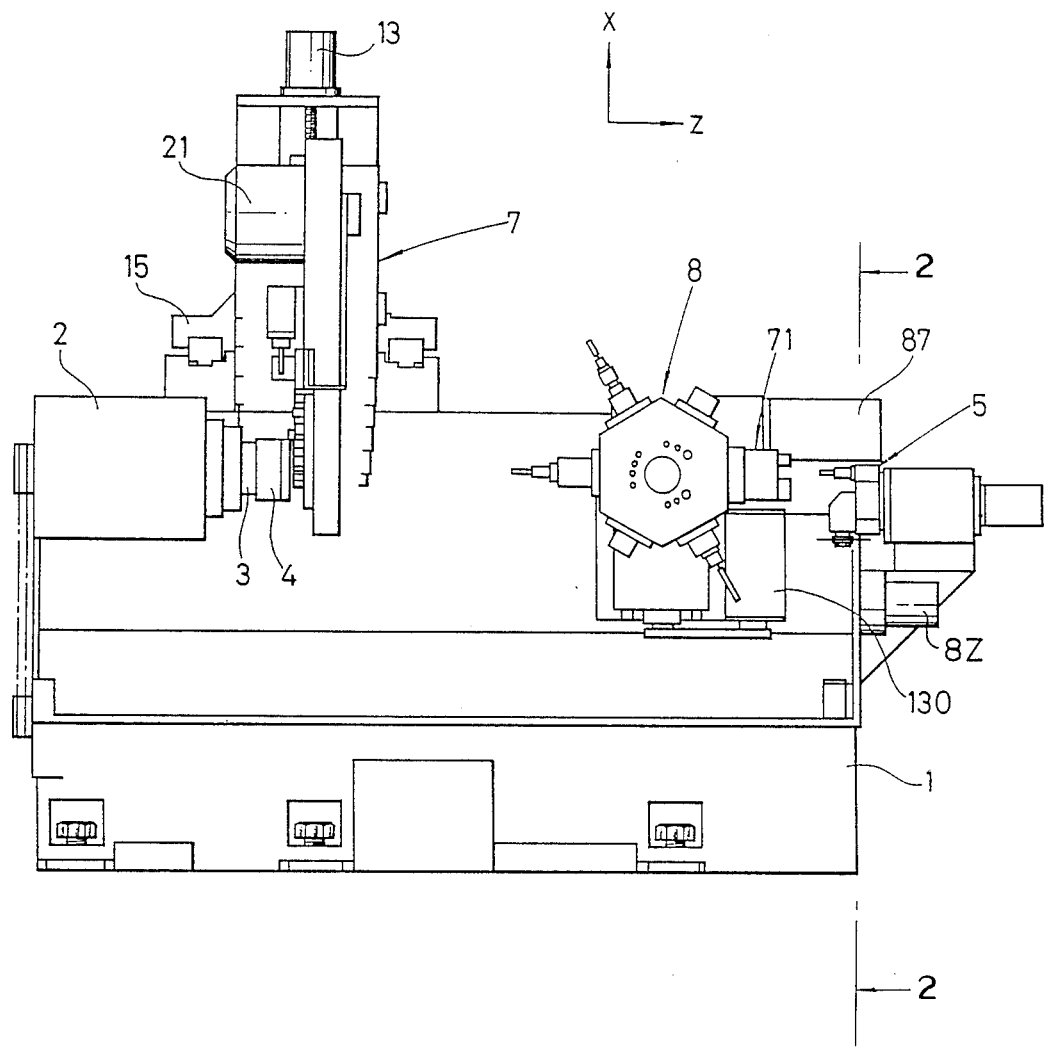
FIG. 1 is a front view of one embodiment of the NC lathe that employs the turret head and rear machining head according to the present invention.
Figure 2:
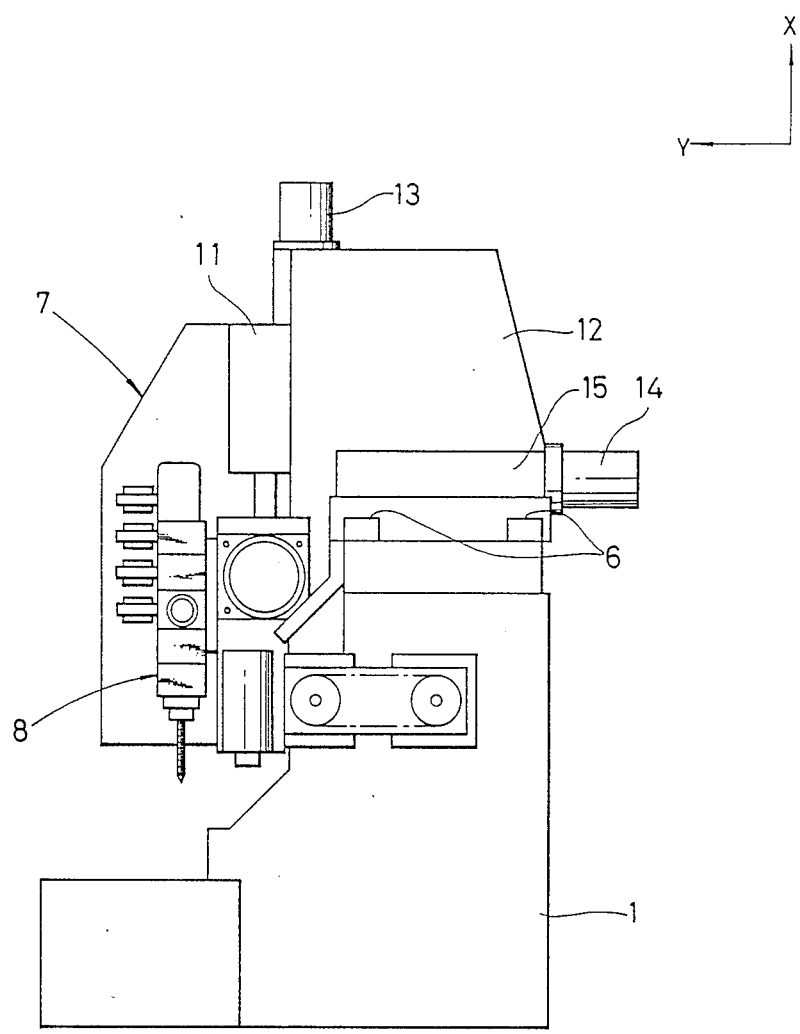
FIG. 2 is a side view of the embodiment shown in FIG. 1.
Figure 3:
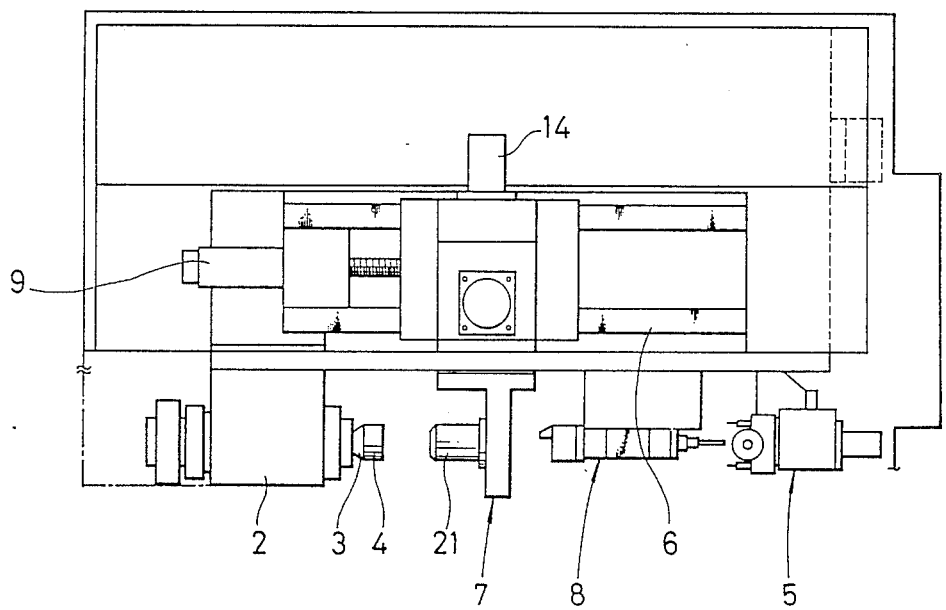
FIG. 3 is a plan view of the embodiment shown in FIG. 1.

Embodiments of the present invention will be described below with reference to the accompanying drawings. FIG. 1 is a front view of one embodiment of the NC lathe according to the present invention, and FIG. 2 is a sectional side view taken along the line 2—2 of FIG. 1. FIG. 3 is a plan view of the NC lathe. The bed 1 is a structure which is made of a known metallic material, for example, a cast metal. Sliding or rolling guide ways are provided on the bed 1 according to need. On the guide ways are provided a turret head 8, a multiple-tool head 7, a rear machining head 5, etc. (described hereinbelow) in such a manner that these heads are movable by means of respective servomotors. Since the structure of the bed 1 is well known, detailed description thereof is omitted.

A headstock 2 is provided at one end of the bed 1. The headstock 2 is a substantially box-shaped structure which is fixed to the bed 1 by means, for example, bolts, so that the headstock 2 is not movable relative to the bed 1. A main spindle 3 is rotatably supported in the headstock 2. The spindle 3 is belt-driven by a motor (not shown) which is provided inside the bed 1. The spindle 3 is also arranged to rotate about the C-axis, i.e., the axis of the main spindle 3, by the operation of a C-axis driving servomotor so as to enable indexing. A main spindle chuck 4 is provided at the distal end of the spindle 3. The main spindle chuck 4 has a known structure wherein jaws are closed and opened by means of hydraulic pressure so as to hold and release a workpiece W.

The rear machining head 5 is provided on the upper side of the bed 1 at an end which faces the headstock 2. The rear machining head 5 can be moved and set at a desired position in a direction which is parallel with the Z-axis, i.e., the direction of the W-axis, by the operation of a servomotor (not shown). In this embodiment, however, the rear machining head 5 is not moved during machining. If the NC lathe is capable of controlling the rear machining head 5, the head 5 may be controlled simultaneously during machining. The rear machining head 5 has rotary tools, for example, a drill and a metal saw, and a turning tool, and when the rear machining head 5 is to be used, a necessary tool is indexed, as described later. The multiple-tool head 7 is provided on the upper side of the bed 1.

The multiple-tool head 7 is provided on a vertical slide 11. The vertical slide 11 is movable on a carriage 12 in the vertical direction, that is, in the X-axis direction, by the operation of an X-axis servomotor 13. The carriage 12 is movable on a carriage 15 in the Y-axis direction by the operation of a Y-axis servomotor 14. The carriage 15 slidably moves on guide ways 6 provided on the upper side of the bed 1 along the Z-axis by the operation of a Z-axis servomotor 9. The multiple-tool head 7 comprises an annular turret body which has a plurality of cutting and rotary tools provided along the outer periphery thereof. Thus, the multiple-tool head 7 is movable along the X-, Y- and Z-axes under control of a numerical controller (not shown), and a necessary tool can be selected.

The turret head 8 is provided on the front side of the bed 1. The turret head 8 is moved in X- and Z-axes by respective servomotors under control and, at the same time, it is possible to index a necessary one of the tools provided on the turret head 8, in the same way as in the case of the multiple-tool head 7. Indexing of the turret head 8 is effected about an axis which is parallel with the Y-axis. The numerical controller controls numerically the rotation, movement and indexing of the spindle 3, the rear machining head 5, the multiple-tool head 7 and the, turret head 8. Since the structure and function of the numerical controller are well known, detailed description thereof is omitted.

MULTIPLE-TOOL HEAD

Figure 4:
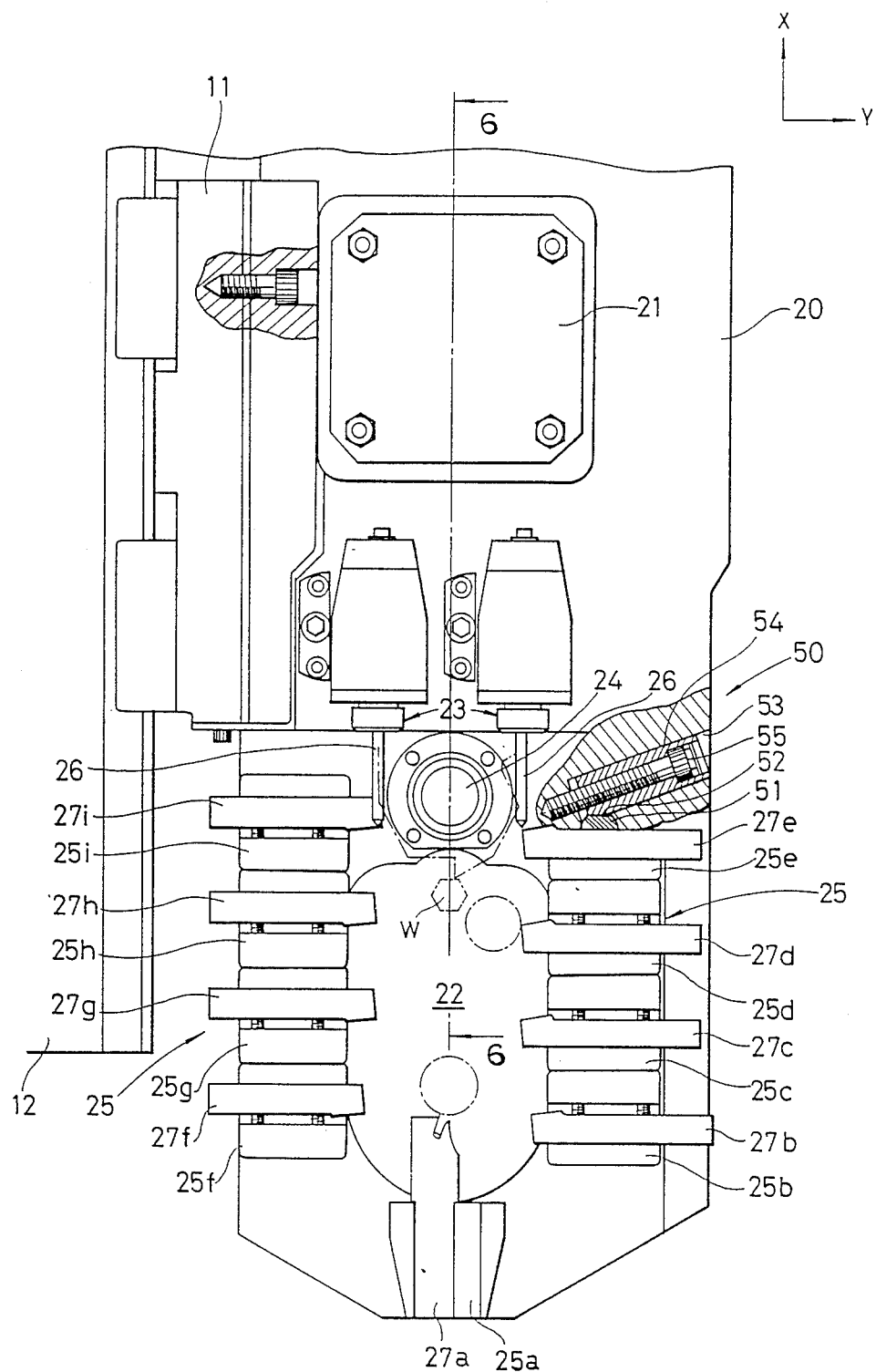
FIG. 4 is a front view of the multiple-tool head.

FIG. 4 is a front view of the multiple-tool head 7 as viewed from the headstock side. The vertical slide 11 that constitutes the multiple-tool head 7 is slidable up and down on the carriage 12 by the operation of the X-axis servomotor 13. A multiple-tool head body 20 which has an annular and rectangular frame structure is provided on the vertical slide 11 in one unit. It should be noted that, although the multiple-tool head body 20 in this embodiment is annular, it does not necessarily need to have a completely closed annular configuration but may be partially opened. The multiple-tool head body 20 has a space 22 which extends through a part thereof. Cutting is mainly conducted within this space 22. A rotary tool driving motor 21 is provided on the upper part of the side of the multiple-tool head body 20. The motor 21 is an electric motor for driving a rotary tool.

The multiple-tool head body 20 has two rotary tool holders 23, one polygon tool holder 24 for polygon machining and nine turning tool holders 25 for external machining. The rotary tool holders 23 are used to attach rotary tools 26 for drilling, tapping, etc. The two rotary tool holders 23 are provided on the upper part of the multiple-tool head body 20 so as to extend parallel with each other in the downward direction (the X-axis direction). The polygon tool holder 24 is used to attach a polygon tool 27 for polygon machining, that is, machining in which a workpiece W is cut into a polygon by rotating the main spindle and a rotary tool under control. The turning tool holders 25 has nine cutting tools 27a to 27i for cutting the outer periphery of a workpiece. Among them, the cutting tool 27a is exclusively for cutting-off. The cut-off tool 27a, which is mainly used to cut off a workpiece W, is provided at the lowermost end of the multiple-tool head body 20 in such a manner that the cutting edge thereof faces the center of the space 22. The cutting tools 27b, 27c, 27d and 27e are disposed with their respective cutting edges directed in the same direction. When a workpiece W is subjected to turning, cuttings flow toward the upper side of the cutting tools 27b, 27c, 27d and 27e.

On the other hand, the cutting tools 27f, 27g, 27h and 27i are attached in such a manner that their respective cutting edges face downward, that is, in the opposite direction to the direction of the cutting edges of the cutting tools 27b to 27e. Thus, when a workpiece W is cut with these cutting tools, cuttings flow downward.

Figure 5:
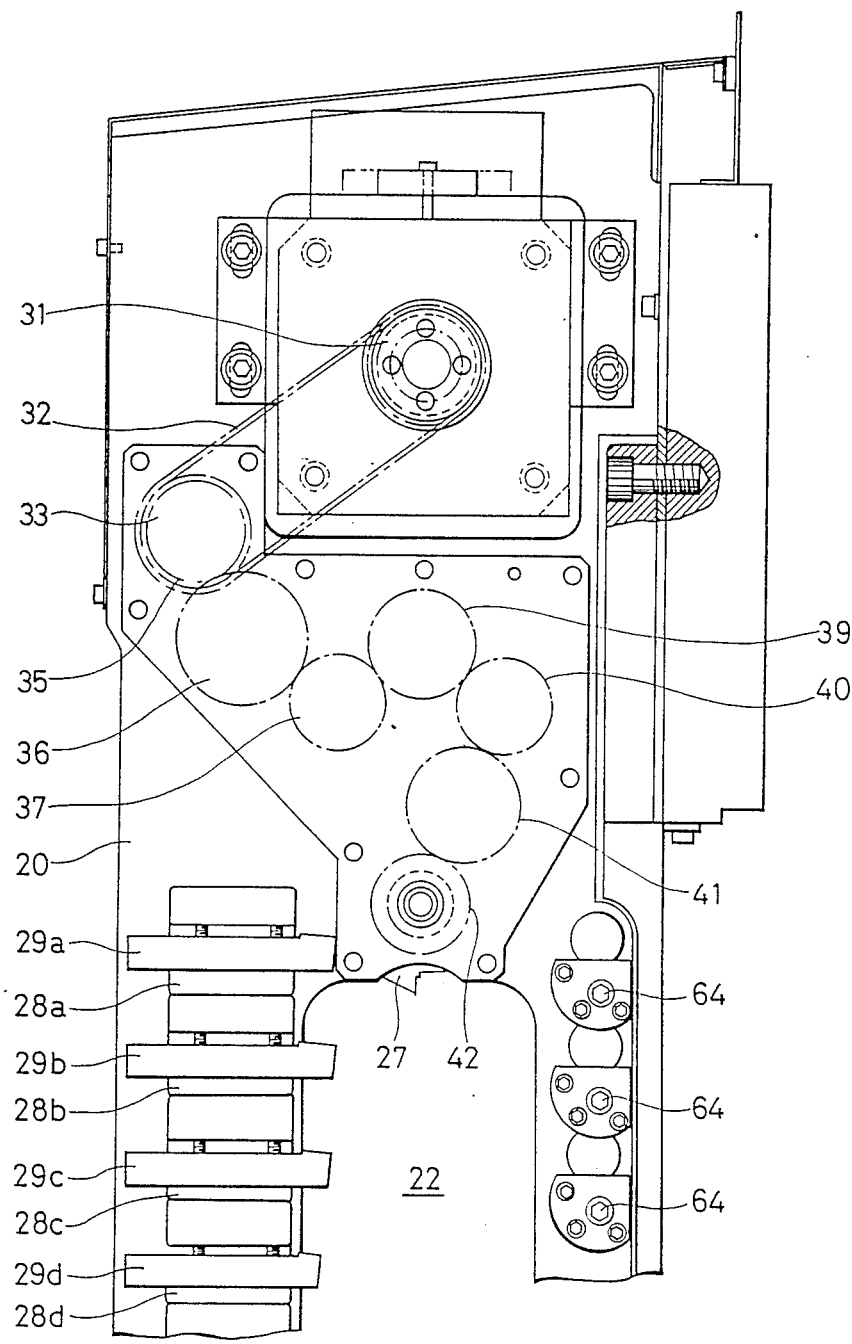
FIG. 5 is a rear view of the multiple-tool head.
Figure 6:
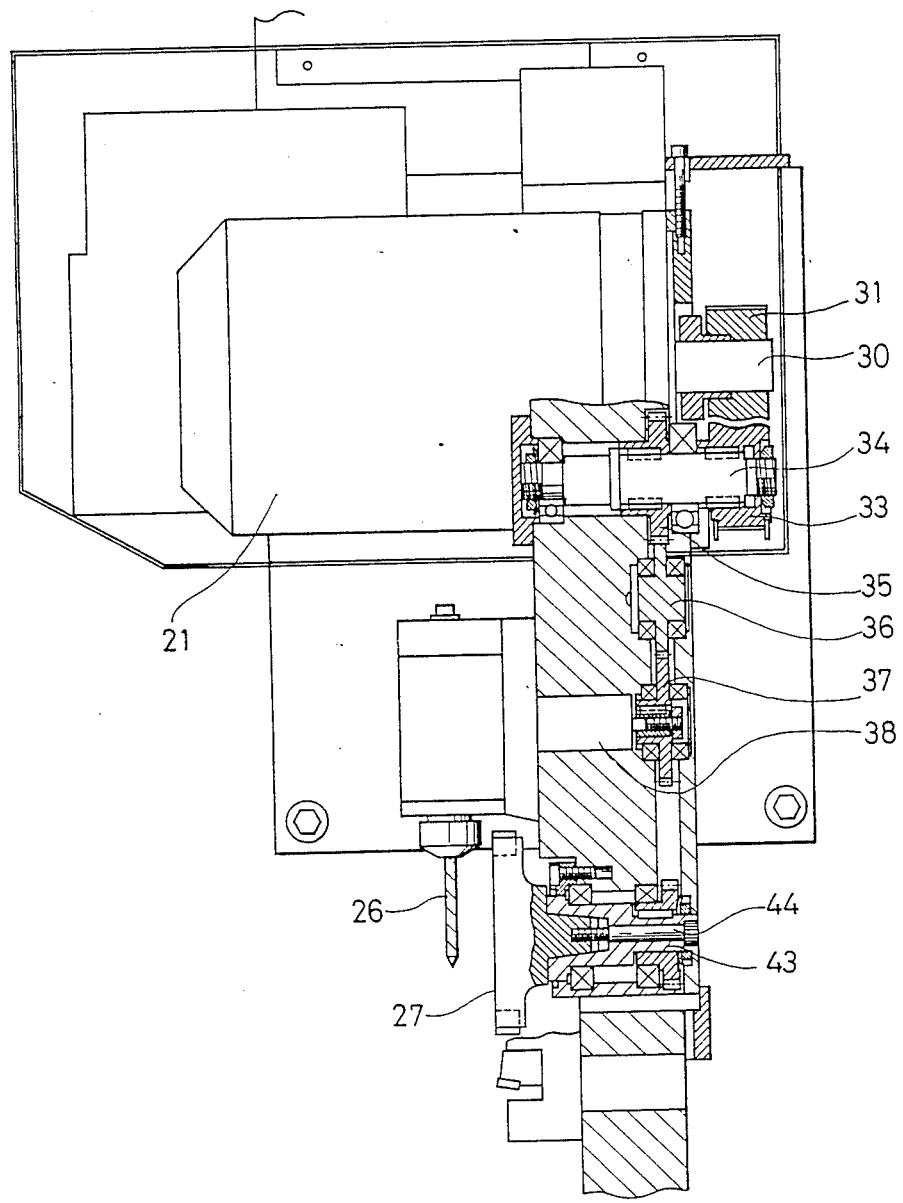
FIG. 6 is a sectional view taken along the line 6—6 of FIG. 4.

FIG. 6 is a sectional view taken along the line 6—6 of FIG. 4, which shows a gear transmission mechanism for driving the rotary tool holders 23 and the polygon tool holder 24. The output of the rotary tool driving motor 21 is transmitted to a pulley 33 from a pulley 31 keyed to an output shaft 30 through a timing belt 32 (see FIG. 5). The rotation of the pulley 33 is transmitted to a shaft 34 to drive a gear 35 which is rigidly secured to the shaft 34. As the gear 35 rotates, an idle gear 36 rotates, causing a gear 37 to rotate. Since the gear 37 is keyed to a tool shaft 38, the gear 37 eventually rotates the tool shaft 38. The rotation of the tool shaft 38 causes one rotary tool 26 to rotate through a bevel gear transmission mechanism (not shown).

At the same time, the other rotary tool 26 is similarly rotated through an idle gear 39 driven through the gear 37 and a gear 40, as shown in FIG. 5. The gear 40 is further meshed with an idle gear 41 which is, in turn, meshed with a gear 42. The gear 42 is keyed to a polygon tool shaft 43. The polygon tool 27 is clamped by means of a bolt 44 from the back thereof at one end of the polygon tool shaft 43. The polygon tool 27 has three cutting edges on the outer periphery.

As has been detailed above, the rotation of the rotary tool driving motor 21 causes the rotary tools 26 and the polygon tool 27 to rotate through the timing belt and gear transmission mechanism. Although no description was made with respect to a cutting tool used to machine the inner periphery of a workpiece in the foregoing embodiment, it should be noted that internal machining can be conducted by attaching a cutting tool with the angle of installation being changed 90° C., although not illustrated. In this embodiment, however, internal machining tool holders can be attached only at the positions of the cutting tools 27d and 27h. Four rear machining tools 29a to 29d are attached to the end face of the multiple-tool head body 20 on the side thereof which is closer to the turret head 8 (see FIG. 5).

A clamp mechanism 50 shown in FIG. 4 is a mechanism for clamping each of the five tool holders 25a, 25b, 25c, 25d and 25e for the cutting tools 27a, 27b, 27c, 27d and 27e to the multiple-tool head body 20. Each tool holder 25 has a fixing shaft 51 on the reverse side thereof.

The fixing shaft 51 is partially cut to form a flat surface portion 52. A clamping cylindrical member 54 is inserted into an insertion hole 53 provided in the multiple-tool head body 20. A part of the clamping cylindrical member 54 is in contact with the flat surface portion 52 of the shaft 51. A bolt 55 is inserted into the center of the cylindrical member 54 in such a manner that the distal end of the bolt 55 is screwed into the multiple-tool head body 20. As the bolt 55 is screwed in, the clamping cylindrical member 54 is forced into the insertion hole 53 while pressing the flat surface portion 52 of the fixing shaft 51. Thus, the fixing shaft 51 is clamped to the multiple-tool head body 20.

Figure 7:
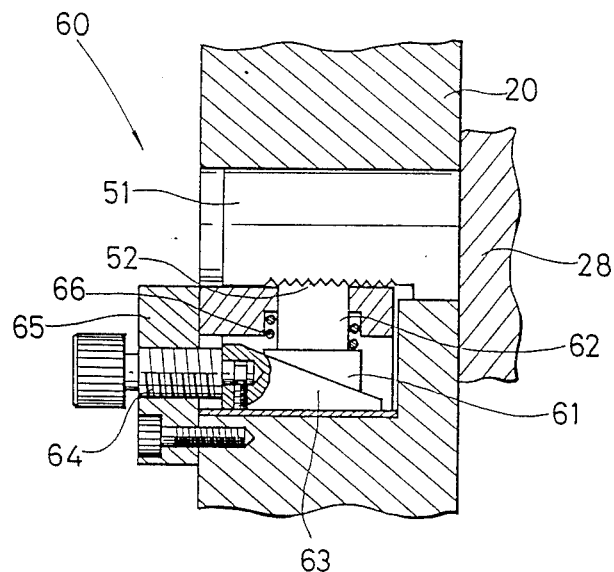
FIG. 7 is a sectional view showing the clamp mechanism of a tool holder.

The clamping mechanism 50 is actuated by turning the bolt 55 from the side of the multiple-tool head body 20. FIG. 7 is a sectional view of one example of a clamping mechanism 60 for each of the tool holders 25f, 25g, 25h, 25i and the rear machining tool holders 28a to 28d. The fixing shaft 51 has serrations 52 which are contacted by a pressure member 62 which is similarly serrated. The pressure member 62 is brought into contact with the slant surface of a wedge 63 by the action of a coil spring 66. A bolt 64 is rotatably attached to one end of the wedge 63. The bolt 64 is screwed into a cover 65 which is rigidly secured to the multiple-tool head body 20. Thus, as the bolt 64 is turned, the wedge 63 slides forward, causing the pressure member 62 to move upward, and thus clamping the fixing shaft 51 to the multiple-tool head body 20.

TURRET HEAD

Figure 8:
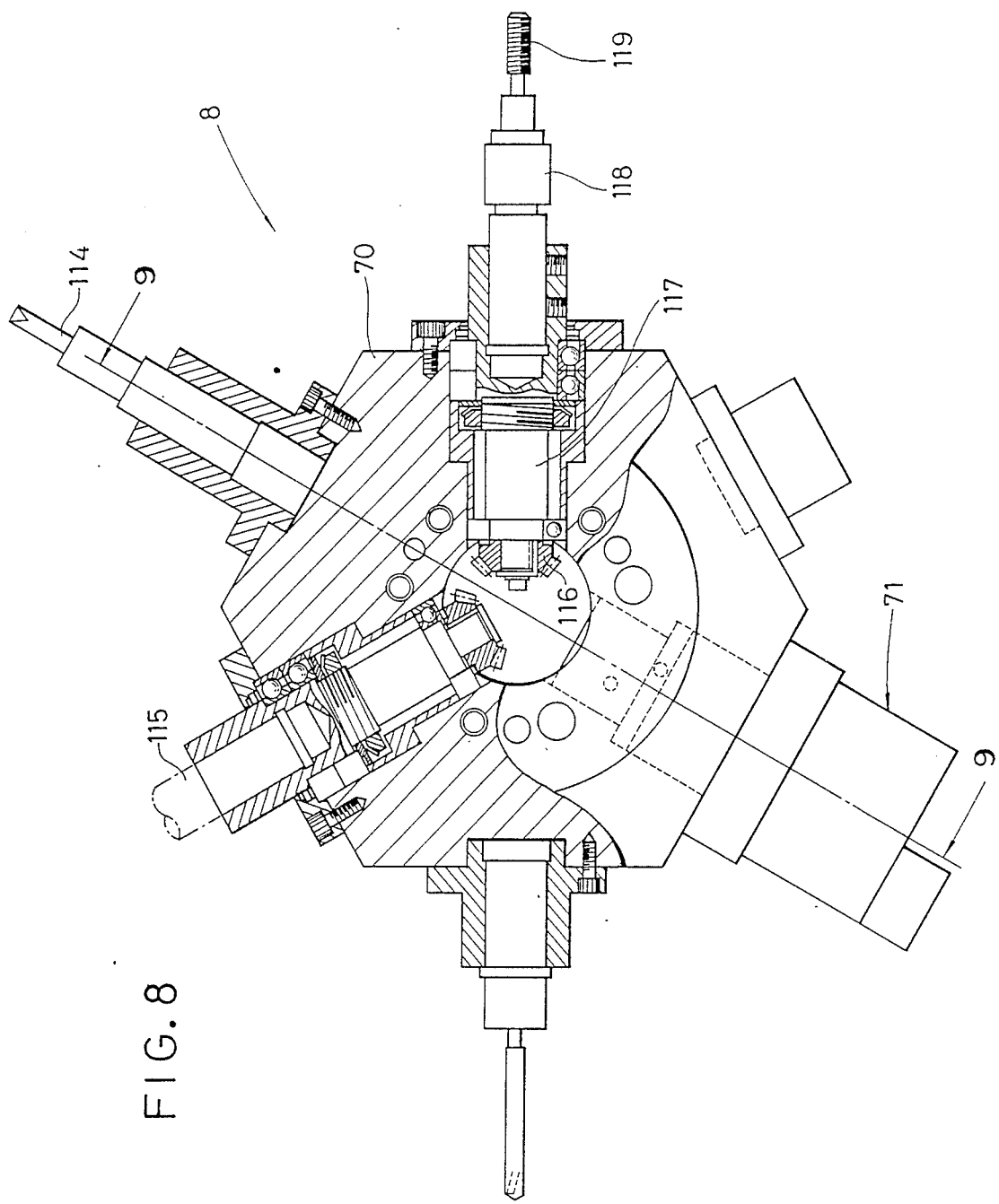
FIG. 8 is a partially-sectioned front view of the turret head.
Figure 9:
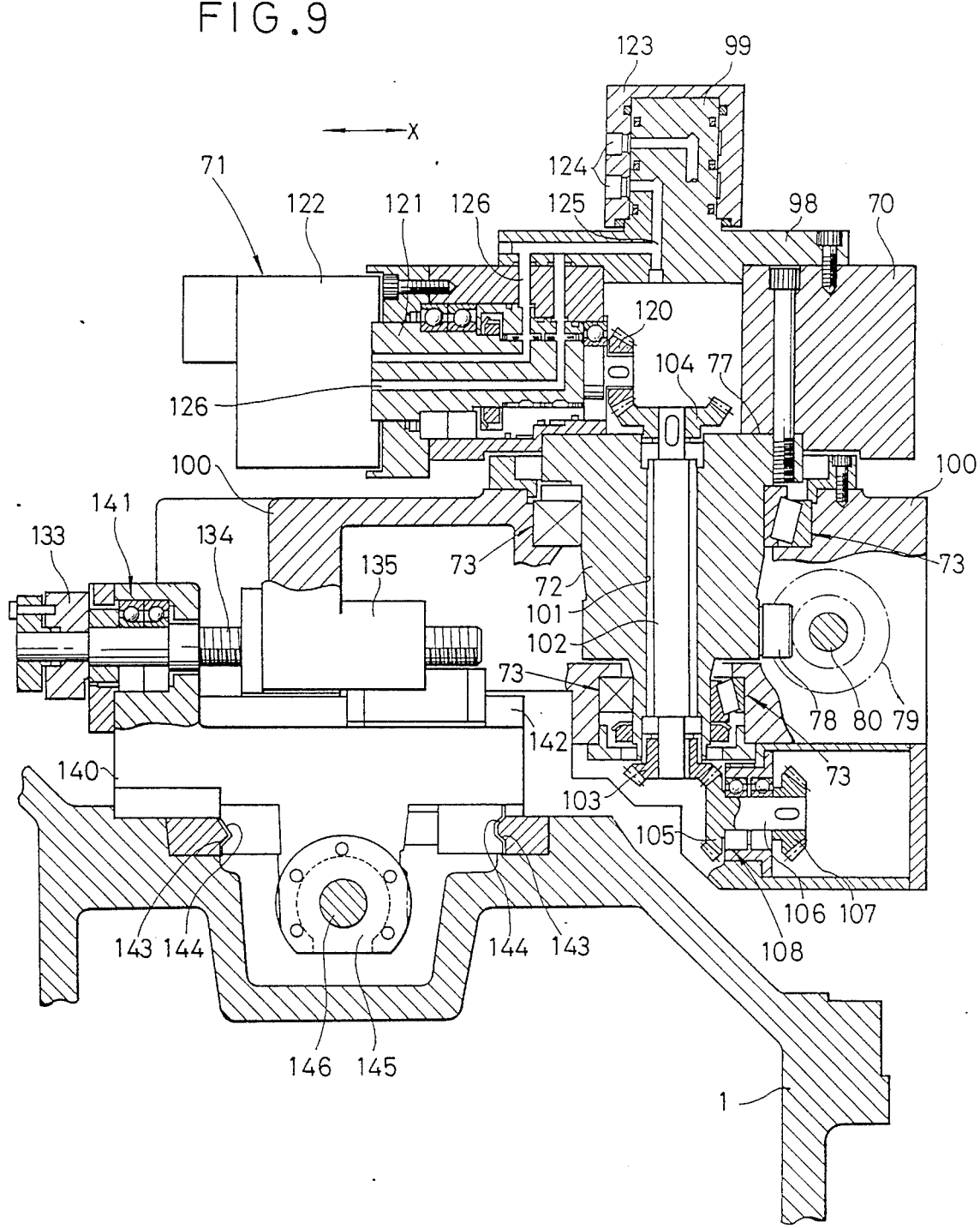
FIG. 9 is a sectional view taken along the line 9—9 of FIG. 8.

FIG. 8 is a partially-sectioned plan view of the turret head 8, and FIG. 9 is a sectional view taken along the line 9—9 of FIG. 8. The turret head 8 has a plurality of radially disposed rotary tools, for example, a tap 119 and a drill 115, and a turning tool 114. For instance, the tap 119, which is a rotary tool, is held by a tap chuck 118. The tap chuck 118 is provided at one end of a tap shaft 117. A bevel gear 116 is keyed to the other end of the tap shaft 117. The turret head 8 has a relatively thick body 70 which has a hexagonal planar configuration.

The rotary tools 115, 119, the turning tool 114 and a secondary-chuck 71 are attached to the respective faces of the hexagonal body 70. The turret head body 70 is mounted on a cross slide 100, so that cutting is effected with a tool provided on the turret head body 70 by moving the cross slide 100. A turret shaft 72 is mounted on one side of the turret head body 70 with two ends thereof rotatably supported through thust bearings 73.

A flange surface 77 is provided on one end of the turret shaft 72. The turret head body 70 is rigidly secured to the turret shaft 72 while being in close contact with the flange surface 77. A plurality of cam followers 78 are provided on that portion of the turret shaft 72 which is between the bearings 73 in such a manner that the cam followers 78 are equally spaced apart from each other along the outer periphery of the turret shaft 72, with the axis of each cam follower 78 extending perpendicular to the axis of the turret shaft 72. Each cam follower 78 is rotatably provided on a shaft through a bearing or other similar means.

Figure 10:
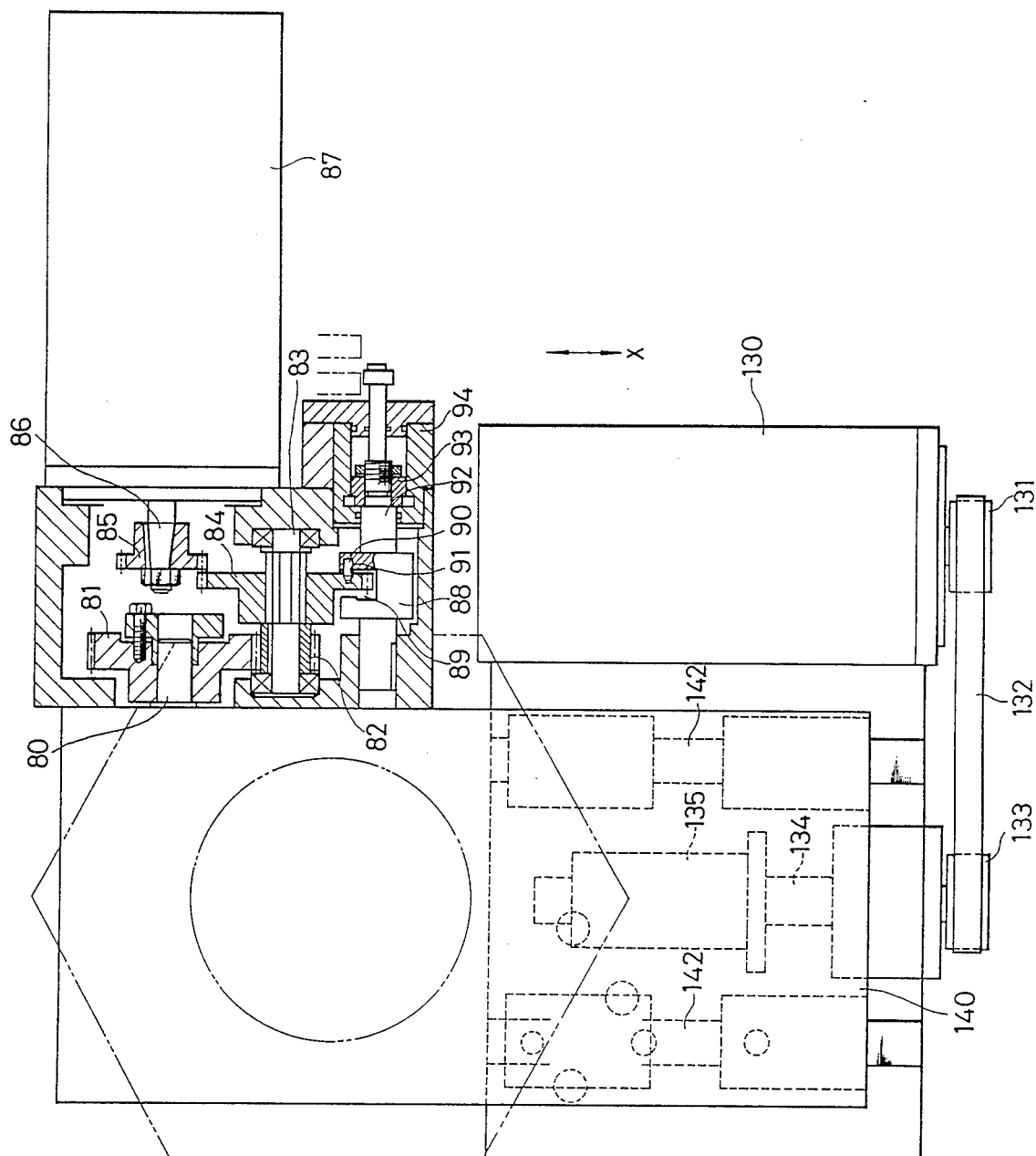
FIG. 10 is a sectional view showing a power transmission mechanism for switching the tool rotating drive and the turret indexing drive from one to-the other.

A roller gear cam 79 is rotatably supported on the cross slide 100. The roller gear cam 79 has a helical groove (not shown because it is well known) formed on the outer periphery thereof. The cam followers 78 are engageable with the groove of the roller gear cam 79. The roller gear cam 79 is rotatable about a shaft 80. A spur gear 81 is rigidly secured to the shaft 80 of the roller gear cam 79 (see FIG. 10). A spur gear 82 is meshed with the spur gear 81.

The spur gear 82 is keyed to one end of a shaft 83. A shift spur gear 84 is provided on the other end portion of the shaft 83 in such a manner that the spur gear 84 is slidable on splines formed on the shaft 83. The shift spur gear 84 is brought into and out of engagement with a pinion 85 by the operation of a shift mechanism or clutch means 88–94. The pinion 85 is keyed to an output shaft 86 of a servomotor 87. On the other hand, a U-shaped shifter 88 is disposed at the outer periphery of the shift spur gear 84.

The shifter 88 has a U-shaped engagement groove 89 in which the shift spur gear 84 is inserted with play. A pin 90 is provided on the shifter 88 so as to project into the engagement groove 89. The pin 90 has a tapered distal end. The one and only pin receiving hole 91 is formed in one side surface of the shift spur gear 84. The pin 90 is inserted into the pin receiving hole 91 to fix the roller gear cam 79 at a predetermined angular position. A piston 93 is integrally provided on a shaft 92 of the shifter 88.

The piston 93 is received in a cylinder 94, so that the shifter 88 is moved by introducing hydraulic pressure into the cylinder 94 to bring the shift spur gear 84 into and out of engagement with the pinion 85. When the shifter 88 moves rightward (as viewed in the figure), the pinion 85 and the shift spur gear 84 are engaged with each other. At this time, the pin 90 is disengaged from the pin receiving hole 91. The shift spur gear 84 causes the roller gear cam 79 to rotate one full turn and the pin 90 is positioned so as to be inserted into the pin receiving hole 91 at the same angular position at all times.

The pin 90 is inserted into the pin receiving hole 91 so that no phase shift will be caused even if the servomotor 87 is driven to rotate a tool when the shift spur gear 84 is out of engagement with the pinion 85. A center bore 101 is provided in the center of the turret shaft 72 (see FIG. 9). A driving shaft 102 is rotatably provided within the center bore 101 with two ends thereof being supported through respective bearings. Bevel gears 103 and 104 are keyed to the two ends, respectively, of the driving shaft 102. A shaft 106 which extends perpendicular to the driving shaft 102 is rotatably supported on the cross slide 100 through a bearing 108.

Figure 11:
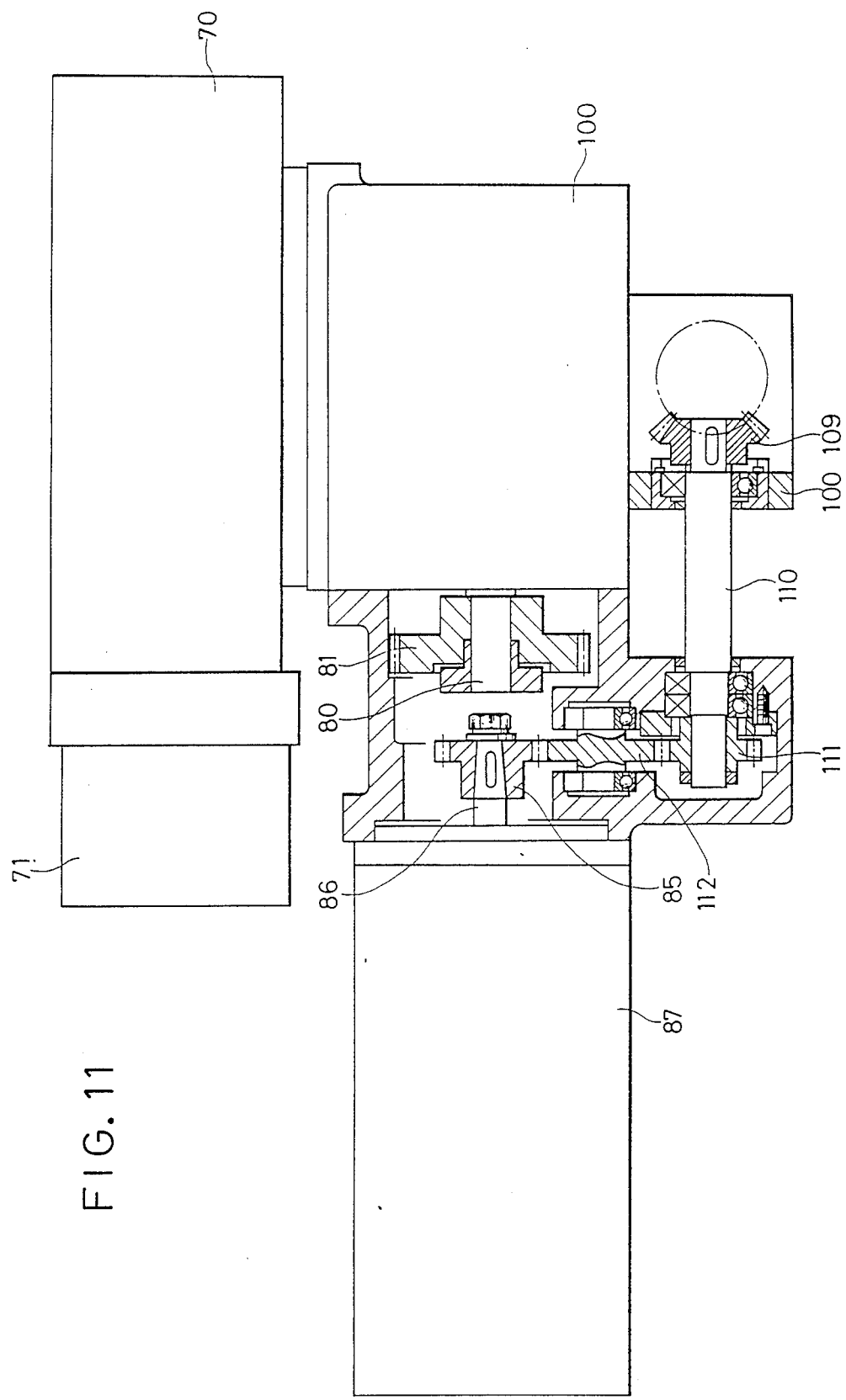
FIG. 11 is a sectional view showing a driving mechanism for a rotary tool.

Bevel gears 105 and 107 are rigidly secured to two ends, respectively, of the shaft 106. The bevel gear 107 is meshed with another bevel gear 108 (see FIG. 11). The bevel gear 109 is keyed to one end of a shaft 110. The shaft 110 is rotatably supported on the cross slide 100. A spur gear 111 is keyed to the other end of the shaft 110, the spur gear 111 being meshed with another spur gear 112 which is, in turn, meshed with the gear 85 that is keyed to the output shaft 86 of the servomotor 87.

The servomotor 87 is used to drive the secondary-chuck 71, the rotary tool 115, etc. More specifically, as shown in FIG. 9, the bevel gear 104 of the driving shaft 102 is meshed with a bevel gear 120 which is keyed to one end of a rear machining chuck shaft 121. Thus, the servomotor 87 is used to rotate the tool or secondary-chuck 71 and also to rotate the turret shaft 72 for indexing. The other end of the rear machining chuck shaft 121 is connected to a rear machining chuck body 122 in one unit. A flange 98 of a fluid coupling shaft 99 is rigidly bolted down to the center of the upper side of the turret head body 70.

A cylindrical coupling pipe 123 is rotatably provided outside the fluid coupling shaft 99. A supply port 124 for supplying pneumatic pressure is provided in the outer periphery of the coupling pipe 123. Pneumatic pressure is supplied to the supply port 124 through a pneumatic pressure supply pipe (not shown). Thus, the coupling pipe 123 and the fluid coupling shaft 99 constitute in combination a fluid rotary coupling for supplying fluid pressure to a rotary shaft. The pneumatic pressure supplied from the supply port 124 passes through a pneumatic pressure passage 125 formed in the fluid coupling shaft 99 and a pneumatic pressure passage 126 in the rear machining chuck shaft 121 to drive chuck jaws provided in the rear machining chuck body 122.

The movement of the cross slide 100 in the X-axis direction is effected by an X-axis servomotor 130 (see FIG. 10) through a ball screw. A pulley 131 is provided on the output shaft of the X-axis servomotor 130. On the other hand, a ball nut 135 is rigidly secured inside the cross slide 100. A ball screw 134 is screwed into the ball nut 135 in the X-axis direction. The ball screw 134 is supported on a carriage 140 through a bearing 141 in such a manner that the ball screw 134 is rotatable but immovable in the axial direction.

A pulley 133 is rigidly secured to one end of the ball screw 134. A timing belt 132 is stretched between the pulleys 133 and 131. Accordingly, as the X-axis servomotor 130 is rotated, the ball screw 134 is rotated through the pulley 131, the timing belt 132 and the pulley 133. As the ball screw 134 rotates, the ball nut 135 moves along the X-axis, so that the cross slide 100 moves while rolling on rolling guide ways 142 provided on the carriage 140 with balls interposed therebetween.

Two V-shaped guide ways 143 are formed on the lower (as viewed in FIG. 9) surface of the carriage 140 so as to extend in the Z-axis direction. The guide ways 143 are guided by rolling guide ways 144 which are provided on the bed 1. A ball nut 145 is rigidly secured to the side of the carriage 140 which is closer to the bed 1. A Z-axis ball screw 146 is screwed into the ball nut 145. Accordingly, as the Z-axis servomotor 82 is driven, the carriage 140 moves on the rolling guide ways 144 with balls interposed therebetween.

REAR MACHINING HEAD

Figure 13:
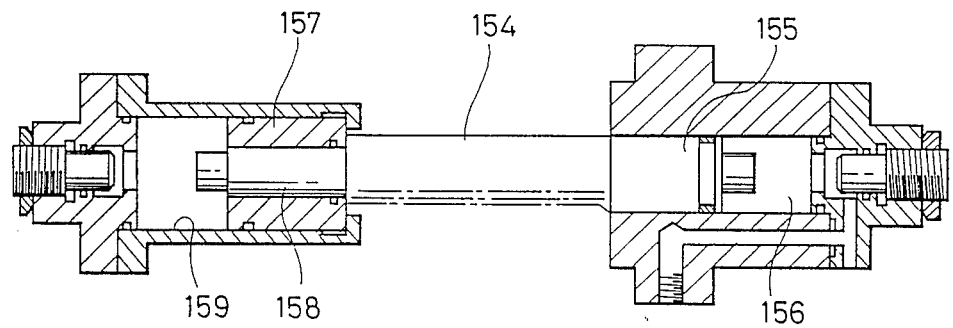
FIG. 13 is a sectional view showing an indexing driving mechanism for the rear machining head.
Figure 12:
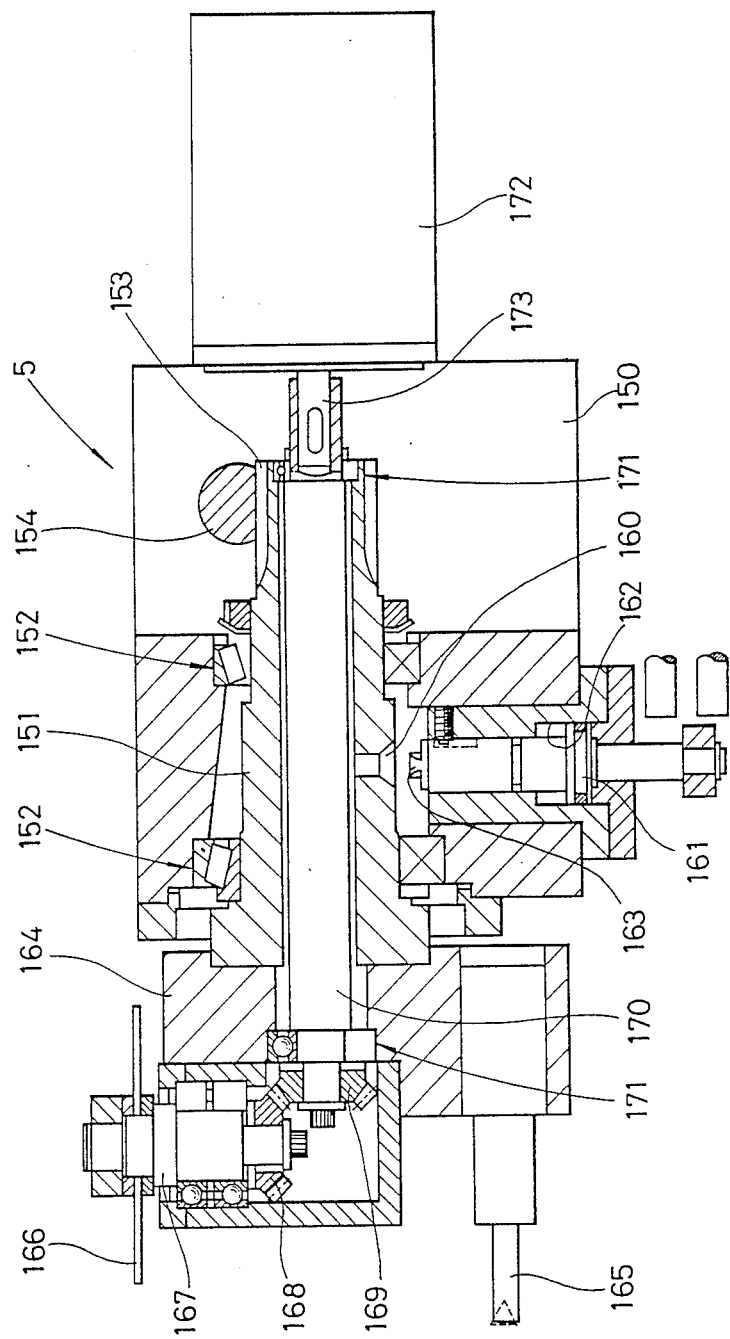
FIG. 12 is a sectional view showing the structure of the rear machining head.

FIG. 12 is a sectional view of the rear machining head 5, and FIG. 13 shows the indexing driver portion of the head 5. The rear machining head 5 is mounted on a carriage (not shown) which is moved only in the Z-axis direction by the operation of a Z-axis servomotor. The rear machining head 5 has a body 150 which is fixed on the carriage. A turret shaft 151 is rotatably supported inside the body 150 through bearings 152. A gear 153 is formed on the outer periphery of one end portion of the turret shaft 151.

The gear 153 is meshed with a rack 154 which is provided so as to extend perpendicular to the axis of the turret shaft 151. A piston 155 is integrally provided at one end of the rack 154. The piston 155 is received in a cylinder chamber 156. A small-diameter portion 158 is formed at the other end of the rack 154, the small-diameter portion 158 being inserted into a movable piston 157. The piston 157 is movably received in a cylinder chamber 159.

The above-described cylinder device can select any of the three positions, that is, the position shown in FIG. 13, the position where the piston 155 is at the right-hand extremity of its travel, and the position where the movable piston 157 is at the left-hand extremity of its travel within the cylinder 159 and hence the rack 154 is at the left-hand extremity of its travel. When the cylinder device selectively assumes these three positions, the rack 154 moves while rotating the gear 153, thus causing the turret shaft 151 to rotate for indexing a tool to be used or for assuming a neutral position where no tool is used. A positioning bore 160 is formed in the outer periphery of the turret shaft 151.

On the other hand, the body 150 has a piston 161 which is received in a cylinder 162. The distal end of the piston 161 is inserted into the positioning bore 160 provided in the turret shaft 151 to position and fix the turret shaft 151. A turret body 164 is rigidly secured to the distal end of the turret shaft 151. A cutting tool 165 and a metal saw 166 are attached to the distal end of the turret body 164. The metal saw 166 is rigidly secured to one end of a shaft 167 which is rotatably supported on the turret body 164 through bearings.

A bevel gear 168 is keyed to the other end of the shaft 167. The bevel gear 168 is meshed with a bevel gear 169 which is keyed to one end of a driving shaft 170 which is rotatably supported by the turret body 164 and the turret shaft 151 through bearings 171. The rear end of the driving shaft 170 is keyed to an output shaft 173 of a driving motor 172. The driving motor 172 rotates the metal saw 166 through the output shaft 173, the driving shaft 170, the bevel gear 169, the bevel gear 168 and the shaft 167.

MACHINING EXAMPLES

Figure 14A:
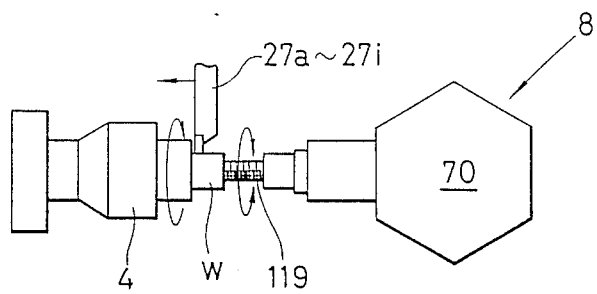
FIGS. 14 (a), 14(b) and 14 (c) respectively show examples of use of the turret head and the rear machining head.

FIG. 14(a) shows an example in which a workpiece W which is held by the main spindle chuck 4 attached to the main spindle 3 is simultaneously subjected to tapping with the tap 119 attached to the turret head 8 (see FIG. 8) and external cutting with one of the cutting tools 27a to 27i attached to the multiple-tool head 7.

The tap 119 is rotated by the servomotor 87. The output of the servomotor 87 is transmitted to the tap chuck 118 through the output shaft 86, the pinion 85, the spur gear 112, the spur gear 111, the shaft 110, the bevel gear 109 (see FIG. 11), the bevel gear 107, the bevel gear 105, the bevel gear 103, the driving shaft 102, the bevel gear 104 (see FIG. 9), the bevel gear 116 and the tap shaft 117 to rotate the tap 119 (see FIG. 8).

The tapping must be effected at a cutting speed which is suitable for the tap 119 simultaneously with the cutting effected at the multiple-tool head 7. Therefore, the rotational speed of the servomotor 87 is controlled so as to match with the rotational speed of the main spindle 3. The external cutting at the multiple-tool head 7 is effected at an optimal machining speed. Thus, simultaneous machining can be effected with the multiple-tool head 7 and the turret head 8 at optimal machining speed.

Figure 14B:
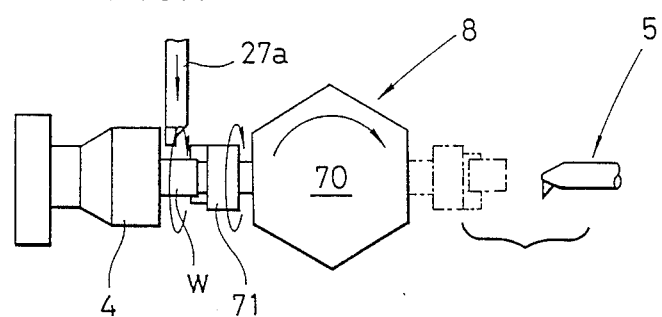
Figure 14C:
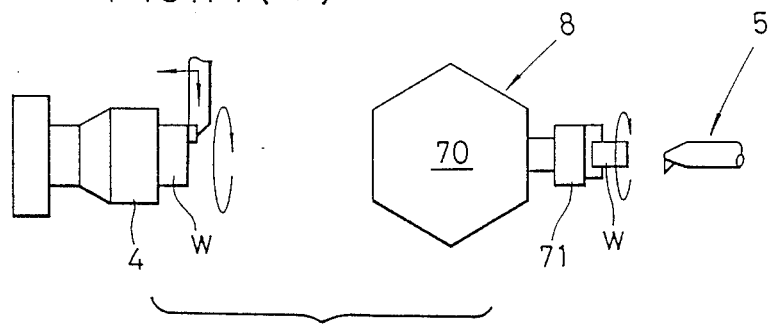

FIG. 14(b) shows an example in which a workpiece W which is simultaneously held at two ends thereof by the main spindle chuck 4 and the secondary-chuck 71 is subjected to cutting-off with the cut-off tool 27a. The secondary-chuck 71 is rotated by driving the servomotor 87 in the same way as in the machining example shown in FIG. 14(a). Since cutting can be effected with the cut-off tool 27a by synchronously rotating the main spindle chuck 4 and the secondary-chuck 71, the workpiece W held by the secondary-chuck 71 can be subjected to rear machining effected at the rear machining head 5 immediately after the cutting-off operation by turning the turret head 8 through 180°. At the same time, the workpiece W held by the main spindle chuck 4 is also subjected to the subsequent machining process, as shown in FIG. 14(c).

Immediately after the completion of the cutting-off operation, the turret head body 70 turns 180°. This turning operation, that is, indexing operation, is conducted as follows. Hydraulic pressure is introduced into the cylinder 94 (see FIG. 10) to drive the piston 93, thereby moving the shifter 88. The shifter 88 causes the shift spur gear 84 to move so as to mesh with the pinion 85. Then, the servomotor 87 starts to rotate the pinion 85, the shift spur gear 84, the shaft 83, the spur gear 82, the spur gear 81, the shaft 80 and the roller gear cam 79.

The roller gear cam 79 drives the cam follower 78 to rotate the turret shaft 72 for indexing. After the indexing has been properly effected, the servomotor 87 is suspended. After the completion of the indexing, the shifter 88 is returned to the previous position and the pin 90 is inserted into the pin receiving bore 91 to lock the shift spur gear 84. Then, the servomotor 87 is rotated again to drive the secondary-chuck 71 through the above-described power transmission path in the same way as the above. Thus, the workpiece W held by the secondary-chuck 71 is subjected to necessary machining at the rear machining head 5. At this time, the turret head 8 is moved in the X- and Z-axis directions under control of the numerical controller to machine, for example, an end face of the workpiece W held by the secondary-chuck 71. In the meantime, another workpiece W held by the main spindle chuck 4 is subjected to ordinary machining with a tool attached to the multiple-tool head 7.

In the foregoing description, no mention was made of devices for controlling the movement of the main spindle 3, the main turret head 7, the turret head 8 and the rear machining head 5. These control devices are controlled by the numerical controller according to a program incorporated therein in advance.

SECOND EMBODIMENT

Figure 15:
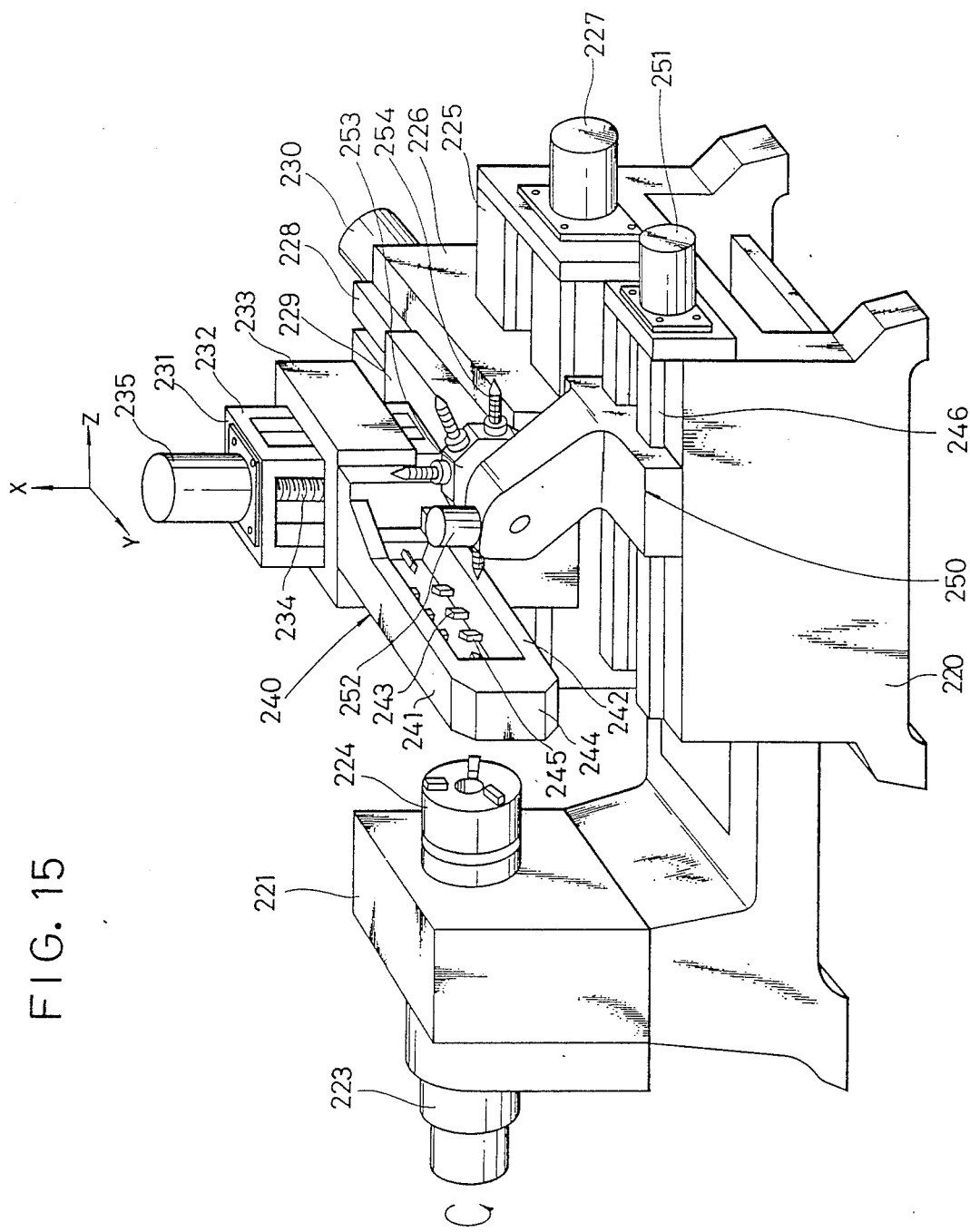
FIG. 15 is an axonometric perspective view of a numerically controlled lathe according to a second embodiment of the present invention.

FIG. 15 is an axonometric perspective view of an NC lathe according to a second embodiment of the present invention. A headstock 221 is provided on the upper side of one end of the bed 220, the headstock 221 rotatably supporting a main spindle through bearings (not shown). The main spindle is rotated by a spindle motor 223 which is provided at the rear end of the headstock 221. The main spindle is made hollow in order to receive a bar as being a workpiece. A chuck 224 for holding a workpiece is provided on the forward end portion of the main spindle.

Guide ways 225 which extend in the Z-axis direction, that is, in the direction of the axis of the main spindle, are formed on the upper side of the bed 220 and forward of the headstock 221. A carriage 226 is movably provided on the guide ways 225. A Z-axis feed screw (not shown) is provided parallel with the guide ways 225 to drive the carriage 226 in the Z-axis direction. A Z-axis feed motor 227 is coupled to the Z-axis feed screw. As the Z-axis feed screw is rotated by the Z-axis feed motor 227, the carriage 226 moves in the Z-axis direction along the guide ways 225.

Horizontal guide ways 228 are formed on the upper side of the carriage 226, the guide ways 228 extending perpendicular to the Z-axis. A cross slide 229 is movably disposed on the guide ways 228. A Y-axis feed screw (not shown) is provided parallel with the guide ways 228 to drive the cross slide 229 in the Y-axis direction, that is, the direction parallel with the guide ways 228. The cross slide 229 is coupled to the Y-axis feed screw and driven by a Y-axis feed motor 130 so as to move on the guide ways 228.

A vertical column 231 which extends perpendicular to the Y-axis is provided on the upper side of the cross slide 229. Guide ways 232 are formed on the surfaces of the column 231. A vertical slide 233 is movably disposed on the guide ways 232. An X-axis feed screw 234 is provided parallel with the guide ways 232 to drive the vertical slide 233 in the X-axis direction, that is, the direction parallel with the guide ways 232. The vertical slide 233 is in thread engagement with the X-axis feed screw 234. An X-axis feed motor 235 is coupled to the X-axis feed screw 234. Accordingly, as the X-axis feed screw 234 is rotated by the X-axis feed motor 235, the vertical slide 233 moves in the X-axis direction along the guide ways 232.

An annular multiple-tool head body 240 is rigidly secured to one side of the vertical slide 233, the multiple-tool head body 240 extending in the Y-axis direction toward the main spindle. The multiple-tool head body 240 has a pair of upper and lower arm portions 241 and 242 each retaining three cutting tools 243 and a pair of side arm portions 244 each retaining a cutting tool 245. On the other hand, guide ways 246 which extend in the Z-axis direction in parallel with the guide ways 225 are formed on the upper side of the bed 220. A turret head 250 is movably provided on the guide ways 246.

A Z-axis feed screw (not shown) is disposed parallel with the guide ways 246 to drive the turret head 250 in the Z-axis direction. The turret head 250 is in thread engagement with the Z-axis feed screw. A Z-axis feed motor 251 is coupled to the Z-axis feed screw. As the Z-axis feed screw is rotated by the Z-axis feed motor 251, the turret head 250 moves in the Z-axis direction along the guide ways 246.

The turret head 250 comprises a turret body 253 in the shape of a rectangular octagonal prism. The turret body 253 is rotated by a servomotor 252 through an indexing mechanism (not shown). A drilling tool 254 is retained on each of the eight side faces of the turret body 253. The drilling tool 254 is positioned such that the axis thereof is within a vertical plane including the axis of the main spindle. The turret head 250 has substantially the same mechanism and structure as those of the above-described embodiment and, therefore, detailed description thereof is omitted.

Since the operation of the NC lathe according to this embodiment is substantially the same as that of the first embodiment, description thereof is omitted.

THIRD EMBODIMENT

Figure 16:
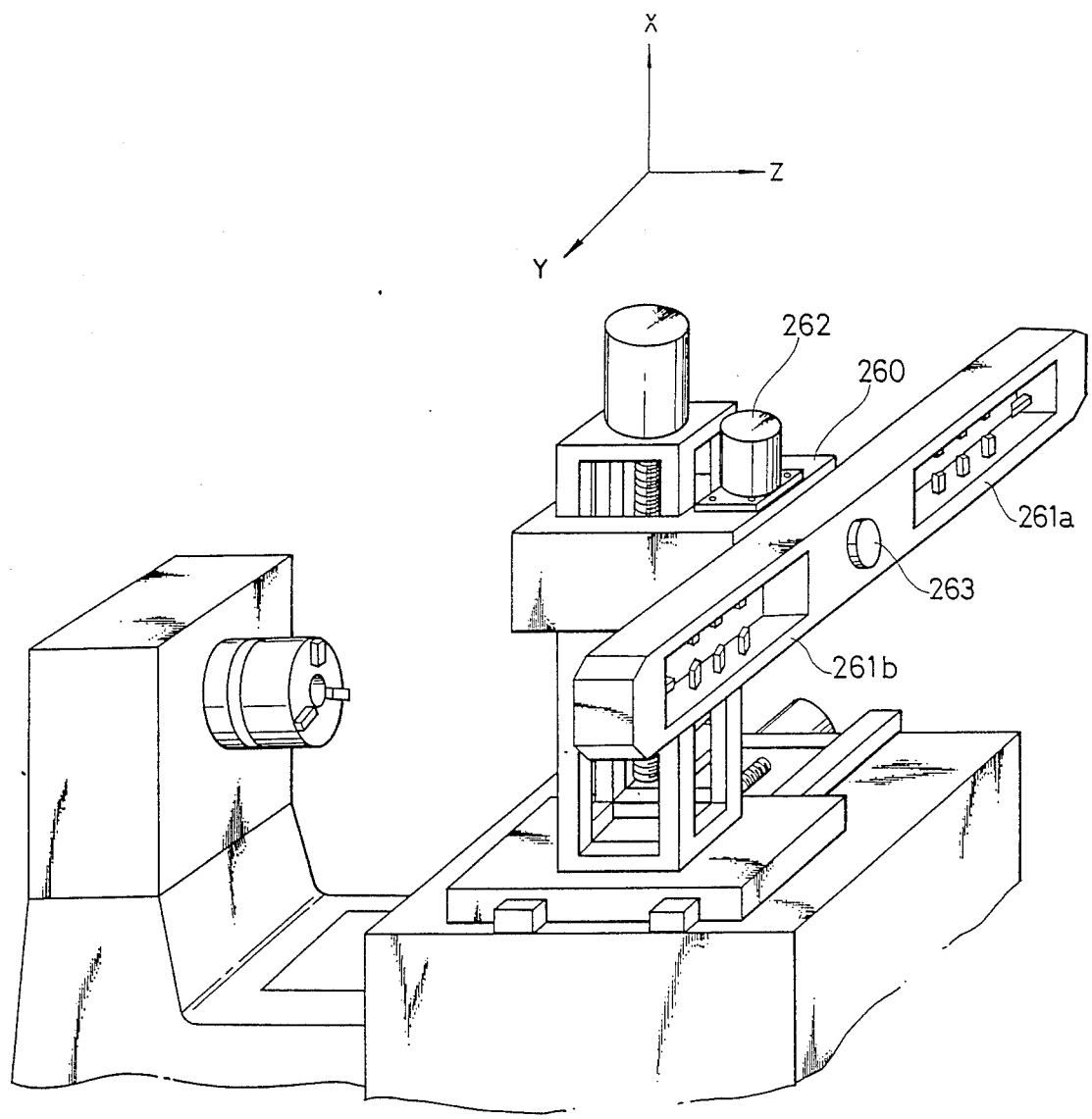
FIG. 16 is an axonometric perspective view of a numerically controlled lathe according to a third embodiment of the present invention.

FIG. 16 is an axonometric perspective view of a third embodiment of the present invention. Although the foregoing embodiments have a single multiple-tool head, the third embodiment has two multiple-tool heads which are provided in one unit and arranged such that a necessary tool can be indexed. Two multiple-tool head bodies 261a and 261b are supported on a vertical slide 260 in such a manner that these multiple-tool head bodies 261a and 261b can be indexed. The multiple-tool head bodies 261a and 261b are rotated for indexing by a motor 262 secured to the vertical slide 260 through a gearing provided inside the vertical slide 260. It should be noted that the multiple-tool head bodies 261a and 261b may be used in a fixed horizontal or vertical position. In this case, the indexing mechanism for the multiple-tool head bodies 261a and 261b may be omitted.

Employment of two multiple-tool head bodies 261a and 261b enables an increase in the number of tools which can be attached to the head at one time and also permits a reduction in the setup time for selection of a tool.

FOURTH EMBODIMENT

Figure 17:
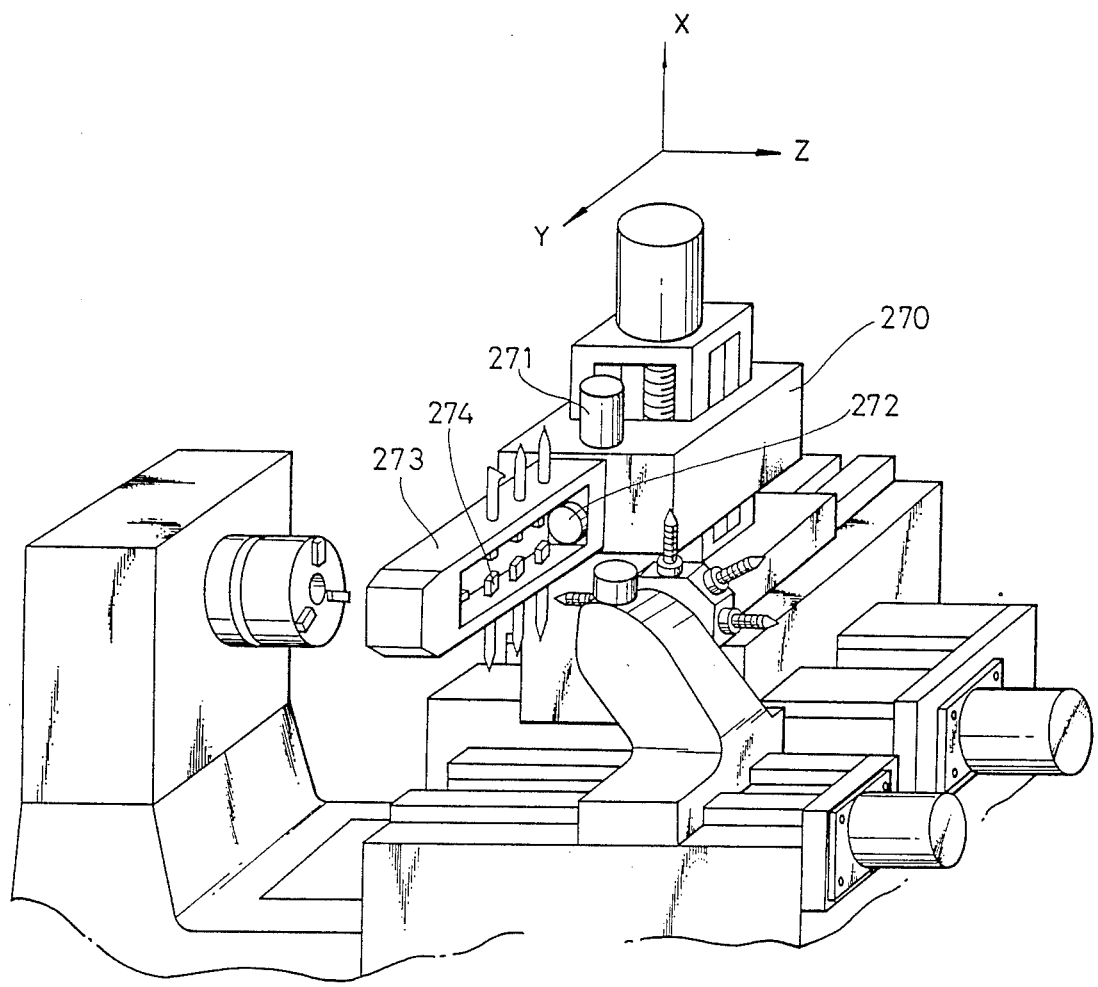
FIG. 17 is an axonometric perspective view of a numerically controlled lathe according to a fourth embodiment of the present invention.

FIG. 17 shows a fourth embodiment of the present invention in which a single multiple-tool head body 273 is rotatably supported on a vertical slide 270. Indexing of the multiple-tool head body 273 is effected by rotating a servomotor 271 which is secured to the vertical slide 270. More specifically, the multiple-tool head body 273 is rotated about an indexing shaft 272 which extends in the Y-axis direction. By this indexing operation, it is possible to change the direction of tools 274 provided on the multiple-tool head body 273. Further tools may be attached to the inner and outer peripheral surfaces of the multiple-tool head body 273.

This embodiment not only enables a great variety and number of tools, for example, external machining tools and recess machining tools, to be attached to the turret head but also permits a reduction in the setup time for selection of a tool.

FIFTH EMBODIMENT

Figure 18:
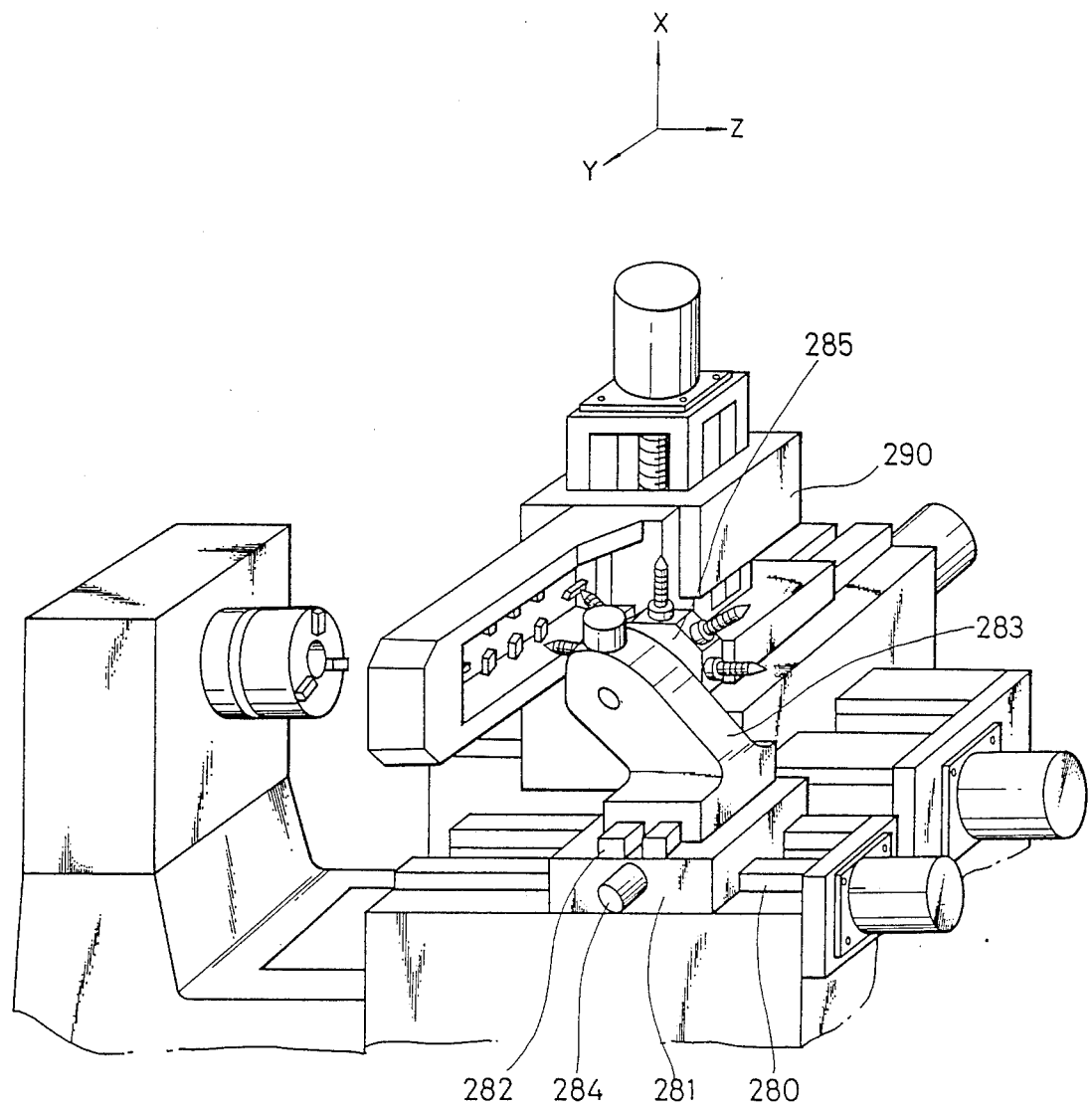
FIG. 18 is an axonometric perspective view of a numerically controlled lathe according to a fifth embodiment of the present invention.

The turret heads in the second, third and fourth embodiments are movable only along the Z-axis. In this embodiment, the turret head is movable along both the Y- and Z-axes in the same way as in the first embodiment. In addition, a second carriage 281 is movably provided on guide ways 280, as shown in FIG. 18. A drilling head 283 is movably provided on guide ways 282 which are installed on the carriage 281 so as to extend in the Y-axis direction. Thus, the drilling head 283 is moved by rotating an Y-axis feed motor 284 through an Y-axis feed screw (not shown) which is disposed parallel with the guide ways 282.

By virtue of the above-described arrangement, a turret head 285 is movable not only in the Z-axis direction but also in the Y-axis direction and it is therefore possible to effect boring with the turret head 285. It should be noted that the drilling head 283 may be arranged so as to be movable in the Y-axis direction by employing a means similar to that for the vertical slide 290; in such a case also, similar advantages are obtained.

Although the present invention has been described by way of various embodiments, it should be noted here that the described embodiments are not necessarily exclusive and that various changes and modifications may, of course, be imparted thereto without departing from the scope of the invention which is limited solely by the appended claims.

OTHER EMBODIMENTS

Although the foregoing multiple-tool head 7 has a special annular configuration, it should be noted that the configuration of the multiple-tool head 7 is not necessarily limitative thereto and that an ordinary turret head may also be employed. Although the foregoing rear machining head 5 carries a metal saw and a cutting tool, other kinds of machining tool may be attached thereto, for example, a drill, a tap, a milling cutter, etc.

What is claimed is:

1. A numerically controlled lathe including a frame constituting the main body of the lathe, a main spindle driven to rotate, a main spindle chuck provided on said main spindle to hold and rotate a workpiece, a multiple-tool head having a plurality of tools, and a tool turret head, wherein the improvement comprises:
   a. said multiple-tool head having three servomotors to move it along three axes defining directions of movement which are perpendicular to each other;
   b. a multiple-tool head body of said multiple-tool head having an annular and rectangular frame structure;
   c. said multiple-tool head body having a space defined and enclosed by said annular and rectangular frame structure so as to extend through a part thereof for machining said workpiece within said space with said tools;
   d. said plurality of tools including at least two rows of rotary and non-rotary tools for machining said workpiece disposed on said multiple-tool head body and having tool axes extending in a direction parallel with one of said directions of movement; and
   e. a tool driving motor disposed on said multiple-tool head body to drive said rotary tools.

2. A numerically controlled lathe according to claim 1, wherein said rotary tools include a polygon machining tool for machining a polygonal workpiece.

3. A numerically controlled lathe according to either one of claims 1 or 2, wherein said non-rotary tools are provided on the reverse side of said multiple-tool head body to machine the rear of said workpiece.

4. A numerically controlled lathe according to claim 1 and further comprising:
   a. a Z-axis servomotor provided on said frame to move said turret head along the axis of said main spindle;
   b. an X-axis servomotor provided to move said turret head along a line perpendicular to said Z-axis;
   c. said turret head having a secondary-chuck for holding said workpiece and a plurality of tools for machining said workpiece;
   d. indexing means including driving means for indexing any of said tools or said secondary-chuck to a position where it is to be used;
   g. rotational driving means for rotating said secondary-chuck and said tools; and
   f. said secondary-chuck being capable of receiving said workpiece from said main spindle chuck and holding it.

5. A numerically controlled lathe according to claim 4, further comprising:
   a. said rotational driving means and said indexing means being driven by the same servomotor; and
   b. a clutch means for selectively switching the drive of said servomotor to said indexing means or said rotational driving means for rotating said rotary tools and said secondary-chuck.

6. A numerically controlled lathe according to either one of claims 4, or 5, further comprising:
   a. a rear machining head disposed on said frame so as to face said main spindle chuck across said turret head;
   b. said rear machining head having a plurality of rotary and non-rotary tools; and
   c. said rear machining head having indexing means for rotary indexing a necessary tool to a position where it is to be used.

* * * * *

UNITED STATES PATENT AND TRADEMARK OFFICE
CERTIFICATE OF CORRECTION

PATENT NO. : 4,949,443
DATED : August 21, 1990
INVENTOR(S) : SARUWATARI et al

It is certified that error appears in the above-identified patent and that said Letters Patent is hereby corrected as shown below:

On the cover page, after Item [76] the following should be inserted:

--[73] Assignees: Hitachi Seiki Co., Ltd., Abiko; Toto Ltd, Kitakyushi, both of Japan--.

Signed and Sealed this

Thirty-first Day of December, 1991

Attest:

HARRY F. MANBECK, JR.

*Attesting Officer*      *Commissioner of Patents and Trademarks*